United States Patent
Wan (10) Patent No.: US 12,155,635 B1
(45) Date of Patent: Nov. 26, 2024

(54) SYSTEMS AND METHODS FOR HTTPS OVER PROXY

(71) Applicant: CABLE TELEVISION LABORATORIES, INC., Louisville, CO (US)

(72) Inventor: Tao Wan, Ottawa (CA)

(73) Assignee: Cable Television Laboratories, Inc., Louisville, CO (US)

(*) Notice: Subject to any disclaimer, the term of this patent is extended or adjusted under 35 U.S.C. 154(b) by 343 days.

(21) Appl. No.: 17/517,747

(22) Filed: Nov. 3, 2021

Related U.S. Application Data (60) Provisional application No. 63/109,252, filed on Nov. 3, 2020.

(51) Int. Cl.
*H04L 9/40* (2022.01)
*H04L 67/02* (2022.01)
*H04L 67/56* (2022.01)

(52) U.S. Cl.
CPC .......... *H04L 63/0281* (2013.01); *H04L 63/08* (2013.01); *H04L 63/166* (2013.01); *H04L 67/02* (2013.01); *H04L 67/56* (2022.05)

(58) Field of Classification Search
CPC . H04L 63/0281; H04L 63/08; H04L 63/0807; H04L 67/56; H04L 63/166; H04L 67/02
See application file for complete search history.

(56) References Cited

U.S. PATENT DOCUMENTS

2019/0182250 A1\* 6/2019 Kiester ............... H04L 63/0428

\* cited by examiner

*Primary Examiner* — Esther B. Henderson
(74) *Attorney, Agent, or Firm* — Armstrong Teasdale LLP (57) ABSTRACT

A computer device is provided for HTTPS over Proxy (HoP). The computer device includes a transceiver configured for operable communication with at least one client device of the communication network via a secure connection with a server device, and a processor including a memory configured to store computer-executable instructions. When executed by the processor, the instructions cause the computer device to receive, from a client device via the communication network, a communication request message including a desired domain, determine a communication authentication token associated with the desired domain, transmit, to the client device, the communication authentication token associated with the desired domain, wherein the client device is configured to validate the communication authentication token, and continue communication with the client device if the client device validates the communication authentication token.

20 Claims, 7 Drawing Sheets

SYSTEMS AND METHODS FOR HTTPS OVER PROXY

CROSS REFERENCE TO RELATED APPLICATIONS

This application claims the benefit of and priority to U.S. Provisional Application No. 63/109,252, filed Nov. 3, 2020, entitled "SYSTEM AND METHOD FOR SECURING HTTP (sHTTP)," which is hereby incorporated by reference in its entirety.

BACKGROUND

The field of the disclosure relates generally to secure communications, and more particularly, to systems and methods for providing HTTPS over proxy to allow for securely communicating between servers and clients through proxies.

HTTP (HyperText Transfer Protocol) over TLS (Transport Layer Security), also known as HTTPS, is known standard for securing HTTP traffic. However, HTTPS creates significant challenges, particularly with regard to authentication, for many use cases that implement HTTP proxy to access plaintext traffic. These use cases can include, but are not limited to, Content Caching, Content Filtering, Distributed Denial of Service (DDOS) attack mitigation, Web Application Firewalls (WAF), and Parental Controls.

One conventional solution uses HTTP proxies, such as middle proxies, where the traffic between a client, such as a browser, and an origin server are routed to a middle proxy device. This solution requires two TCP/TLS connections to be established, one connection between the client and the proxy and another between the proxy and the server. In this solution, the middle proxy needs to impersonate the origin server and provide a certificate from the origin server while being trusted by the client.

However, such conventional HTTP proxies can create significant challenges to server authentication. Some types of proxies, such as forward and middle proxies, must impersonate any website to the to the HTTP client, which typically requires an explicit configuration of trust anchor by the client. Reverse proxies, on the other hand, require configuration with the certificate and the corresponding private key of the origin server in order to impersonate the origin server. These different types of proxies make TLS-based client authentication impossible. With a proxy in the middle, it is difficult for an origin server to authenticate an HTTP client based on TLS certificate.

Therefore, conventional proxy set-ups do not provide sufficient protection to HTTP traffic, since all HTTP traffic becomes available to the proxy, including sensitive information such as user credentials (e.g., passwords), financial information (e.g., credit card numbers), even though the proxy may never need such access to this sensitive information. Furthermore, the conventional proxy approach may also render the proxy itself to be able to tamper with any traffic (both HTTP headers and bodies), even though the proxy may never need to modify some of this traffic.

Accordingly, there is a need in the field for improved techniques that allow for secure transfer of information through proxies.

SUMMARY

In an embodiment, a computer device is provided for HTTPS over Proxy (HoP). The computer device includes a transceiver configured for operable communication with at least one client device of the communication network and via secure connection with a server device, and a processor including a memory configured to store computer-executable instructions. When executed by the processor, the instructions cause the computer device to receive, from a client device via the communication network, a communication request message including a desired domain associated with the server device. The instructions further cause the computer device to determine a communication authentication token associated with the desired domain. The instructions also cause the computer device to transmit, to the client device, the communication authentication token associated with the desired domain. The client device is configured to validate the communication authentication token. The instructions further cause the computer device to continue communication with the client device if the client device validates the communication authentication token.

In an embodiment, a method is provided for HTTPS over Proxy (HoP). The method is implemented by a computer device including a transceiver configured for operable communication with at least one client device of a communication network and via secure connection with a server device and a processor including a memory configured to store computer-executable instructions. The method includes receiving, from a client device via the communication network, a communication request message including a desired domain associated with the server device. The method also includes determining a communication authentication token associated with the desired domain. The method further includes transmitting, to the client device, the communication authentication token associated with the desired domain. The client device is configured to validate the communication authentication token. In addition, the method includes continuing communication with the client device if the client device validates the communication authentication token.

BRIEF DESCRIPTION

These and other features, aspects, and advantages of the present disclosure will become better understood when the following detailed description is read with reference to the following accompanying drawings, in which like characters represent like parts throughout the drawings.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

As used further herein, "CA" may refer to a certificate authority hosting a root certificate and issuing digital certificates that certify the ownership of a public key by the named subject of the certificate. CA may further include, without limitation, one or more of a CA computer system, a CA server, a CA webpage, and a CA web service.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner.

Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

The field of the disclosure relates generally to secure communications, and more particularly, to systems and methods for providing HTTPS over proxy to allow for securely communicating between servers and clients through proxies. In general, proxy devices cause authentication problems especially when using TLS.

The systems and methods described herein provide a "HTTPS over Proxy" solution. This solution provides for a mechanism of authenticating HTTPS/TLS endpoints end-to-end in the presence of HTTP Proxies. This solution solves the problem of authenticating a server over HTTP proxy.

In HTTP over TLS or HTTPS, an HTTP client and a TLS client are combined in the user agent. To request an HTTPS resource, the TLS client first establishes a TLS connection with the server. When verifying the server certificate, the TLS client must validate the server identity in the TLS server certificate against the server hostname obtained from the requesting URL. If they are different, the TLS server certificate will be rejected, and the TLS connection is not established. This is to prevent man-in-the-middle attacks.

The verification of consistency between the server identity in a requesting URL and in TLS server certificate serves the security purpose well when the server being requested for an HTTPS resource (namely origin server) is also the TLS server that terminates the TLS connection with the requesting client (namely origin client). In this case, the TLS server serving the origin client is also the origin server, thus they should have the same identity.

However, when an HTTP proxy is present in between an origin client and an origin server, the origin client TLS connection terminates at the HTTP proxy, not at the origin server. In this case, the TLS server terminating the TLS connection with the origin client is the HTTP proxy which may have a different identity from the origin server. In this case, the requirement that the identity in the TLS server certificate must match the hostname of origin server becomes an issue known as the server identity problem of HTTPS over proxy.

To bypass this server identity problem, an HTTP proxy device often has to adjust its TLS server certificate in order to succeed in establishing TLS connection with a client.

A reverse HTTP proxy (e.g., deployed in content delivery networks (CDNs)) is often supplied with the public key certificate and the associated private key (namely credentials) of an origin server. When a reverse HTTP proxy provides proxy services for multiple origin servers, the proxy is usually provided with the credentials of each origin server. In some deployments, a reverse HTTP proxy may use a same set of credentials for multiple origin servers by using a public key certificate with its SubjectAltName field containing a list of origin server domain names.

While providing an HTTP proxy with the credentials of an origin server will allow the proxy to impersonate the origin server to the client to successfully establish TLS connection, this practice raises a number of security issues. When an HTTP proxy provides proxy services for many origin servers, the HTTP proxy has to be configured with a large number of private keys, significantly increasing the risks of private key disclosures since compromising one HTTP proxy could result in the disclosures of many private keys. While using a shared certificate for multiple origin servers can reduce the number of private keys stored on the proxy, it does not reduce the security risk that compromising of one such proxy allows to impersonate many origin servers. Further, a shared public key certificate could lead to additional security issues, such as in certificate revocation.

An HTTP proxy may also dynamically generate a public key certificate for an origin server or use a wildcard public key certificate when establishing a TLS connection with the client. In this case, the client needs to be provisioned to trust the Certification Authority issuing the certificate for the proxy.

Another problem from HTTPS over proxy relates to client authentication. When an origin client and origin server have a direct TLS connection, the origin server can authenticate the origin client by verifying the client identity in the TLS client certificate against any expected hostname of the client. When an HTTP proxy is in between the client and the server, the client certificate is not received by the origin server.

The HTTPS over Proxy (HoP) systems and methods described herein address the credentials and certificate management problem with the current practice in reverse proxy deployment and client authentication problem. The present systems and methods therefore, represent not only an improvement over conventional proxy techniques, but are also of particular advantageous utility with respect to the recent 5G Release 16, which introduces an additional service communication proxy between clients and servers, such as those for network functions.

The present HoP systems and methods thus address and successfully overcome the security and authentication problems introduced by conventional HTTP proxies, such as according to one or more principles including without limitation: (A) an HTTP proxy should use its own identity and certificate when establishing TLS connections with other parties; (B) an HTTP proxy should be able to obtain explicit authorization from origin server to provide proxying services for the servers; and/or (C) an origin client should be able to decide whether or not to proceed with an HTTP proxy based on the HTTP proxy identity and any authorization grant from the origin server.

In some embodiments, the TLS connection established between the origin client and the proxy should be independent of the second TLS connection between the proxy and the origin server.

In HTTP over Proxy (HoP), an HTTP proxy, which needs to terminate TLS connection, is provided with its own public key certificate. To allow an HTTP client to be aware that a TLS endpoint is a proxy and not an origin server, an HTTP proxy certificate can contain specific patterns that allow it to be differentiated from a regular TLS server certificate, such as, but not limited to, using a new certificate extension or a specific suffix (e.g., proxy) in the domain name.

When an HTTP client establishes a TLS connection with an entity that is detected as an HTTP proxy based on its TLS certificate, the client will not fail the TLS connection immediately even though the identity in the TLS certificate does not match the domain of the requesting URL. Instead, the client proceeds to complete the TLS connection with the proxy and then the client transmits an HTTP GET request for a well-known resource (e.g., GET/hop-token) to the origin server. Upon receiving this HTTP request, the proxy establishes the TLS connection with origin server and forwards the request. The origin server generates an authorization token (e.g., an JWT (JSON Web Token), namely a HoP_token) and transmits the authorization token back to the client via the proxy. This authorization token can be cached by the proxy and provided to the client (such as in a TLS extension) in a subsequent communication with the clients.

The client verifies the HoP_token to ensure that it is from the origin server and is trusted. In addition, the client may also verify that the HTTP proxy is explicitly authorized by the origin server to provide proxy services. After the client successfully verifies the HoP_token, the client sends regular HTTP requests to the origin server.

This token request and response adds the delay of a round trip to the communication. To improve performance and avoid the extra round trip, the HTTP proxy caches the authentication token, which is then transmitted to the client in an TLS extension during the TLS handshaking. The client includes the extension in its TLS client hello to indicate its support of HoP. If there is a cached HoP_token matching the Server Name Indication (SNI), the HTTP proxy send the HoP_token in the TLS extension in the TLS server hello. If the client successfully verifies the received HOP_token, the client proceeds to the regular HTTP request immediately after the establishment of the TLS connection with the proxy.

Figure 1:
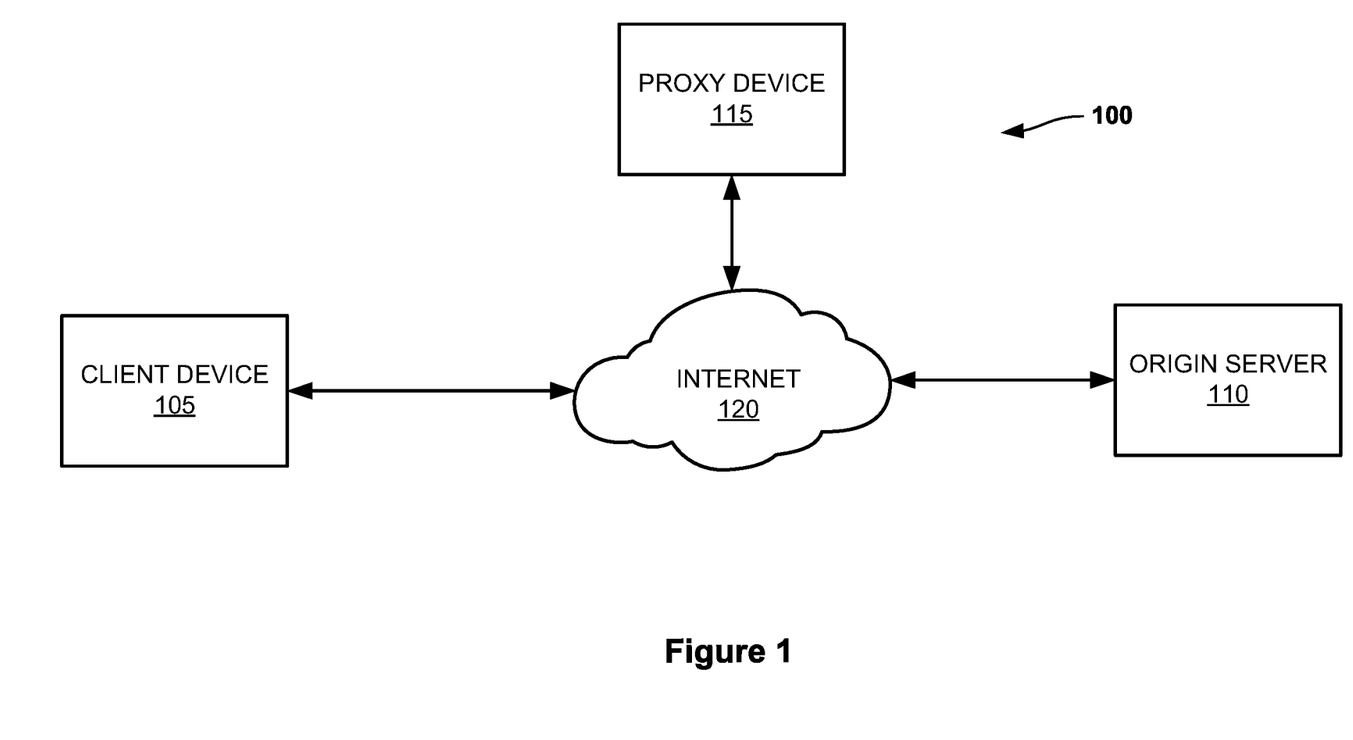
FIG. 1 illustrates a block diagram of a system architecture for use with an HTTPS over proxy system in accordance with at least one embodiment.

FIG. 1 illustrates a block diagram of a system architecture for use with an HTTPS over Proxy (HoP) system 100 in accordance with at least one embodiment. In FIG. 1, a client device 105 is in communication with an origin server 110 through a proxy device 115 via the Internet 120. In the exemplary embodiment, the client device 105 has a TLS connection to the proxy device 115. The origin server 110 also have a TLS connection to the proxy device. In the HOP system 100, the client device 105 and origin server 110 are able to securely communication through the proxy device 115 while still safeguarding the information being transmitted from inspection by the proxy device 115.

As described more fully herein, the HOP system 100 implements an additional security layer within the HTTP layer. This can be used to allow the client device 105 and origin server 110 to authenticate each other. The HOP system 100 uses HTTPS but does not automatically fail when the domain name of the TLS server certificate does not match the requested domain. In this case, the client device 105 verifies if the TLS server certificate is a trusted HTTP proxy certificate. In some embodiments, the HOP system 100 includes a certificate extension for the HTTP proxy certificate.

Figure 2:
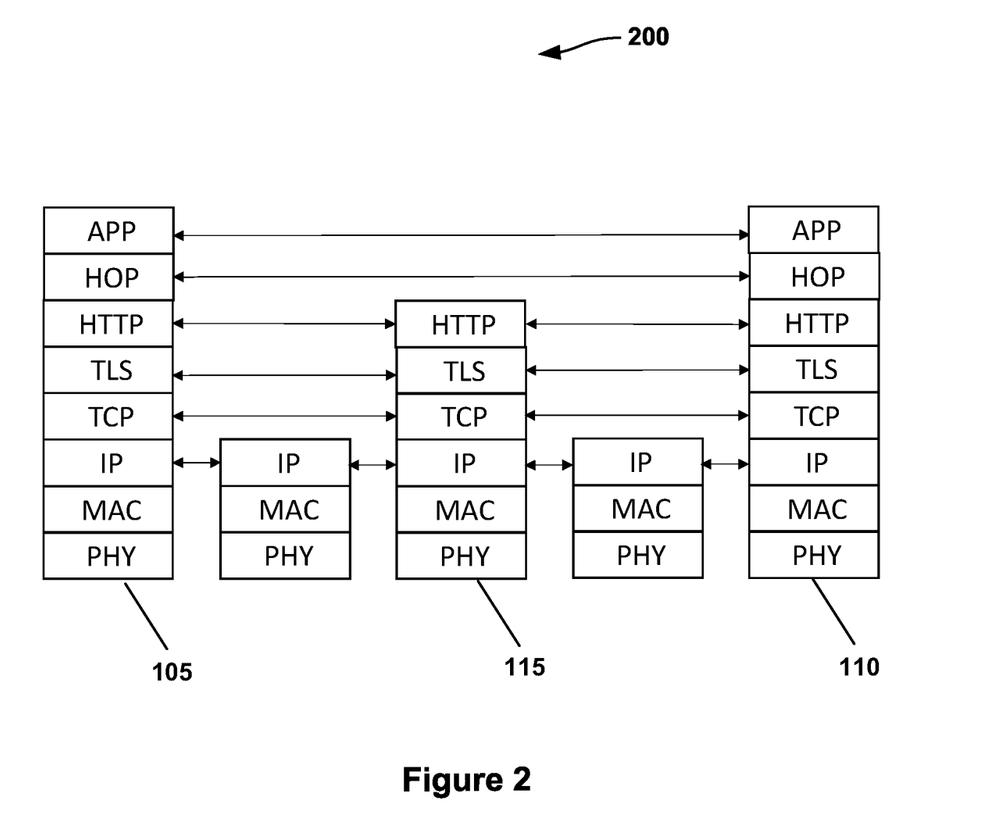
FIG. 2 illustrates a protocol stack for the HTTPS over proxy system shown in FIG. 1 in accordance with at least one embodiment.

FIG. 2 illustrates a protocol stack 200 for the HTTPS over proxy system 100 (shown in FIG. 1) in accordance with at least one embodiment. FIG. 2 illustrates a protocol stack 200 to shown integrating the HoP system 100. Protocol stack 200 illustrates the seven layers of the network protocols and how the three devices (client device 105, origin server 110, and proxy device 115) shown in FIG. 1 interact using those protocols.

As shown in the protocol stack 200, the client device 105 and the origin server 110 are each in communication with the proxy device 115 directly via the HTTP, TLS, and TCP (transmission control protocol) protocols and indirectly via the IP protocol. The TCP and TLS protocols are hop-by-hop protocols, where the data is routed to each device along its path where the messages are addressed to each hop individually. The HTTP and HoP protocols are end-to-end protocols, where the data is routed to its intended destination, but is only accessed at one of the ends.

The HOP layer is added between the App layer and the HTTP layer, where the HTTP layer is accessed by the proxy device 115, while the HOP and App layers pass through the proxy device 115 untouched by the proxy device 115 itself.

Figure 3:
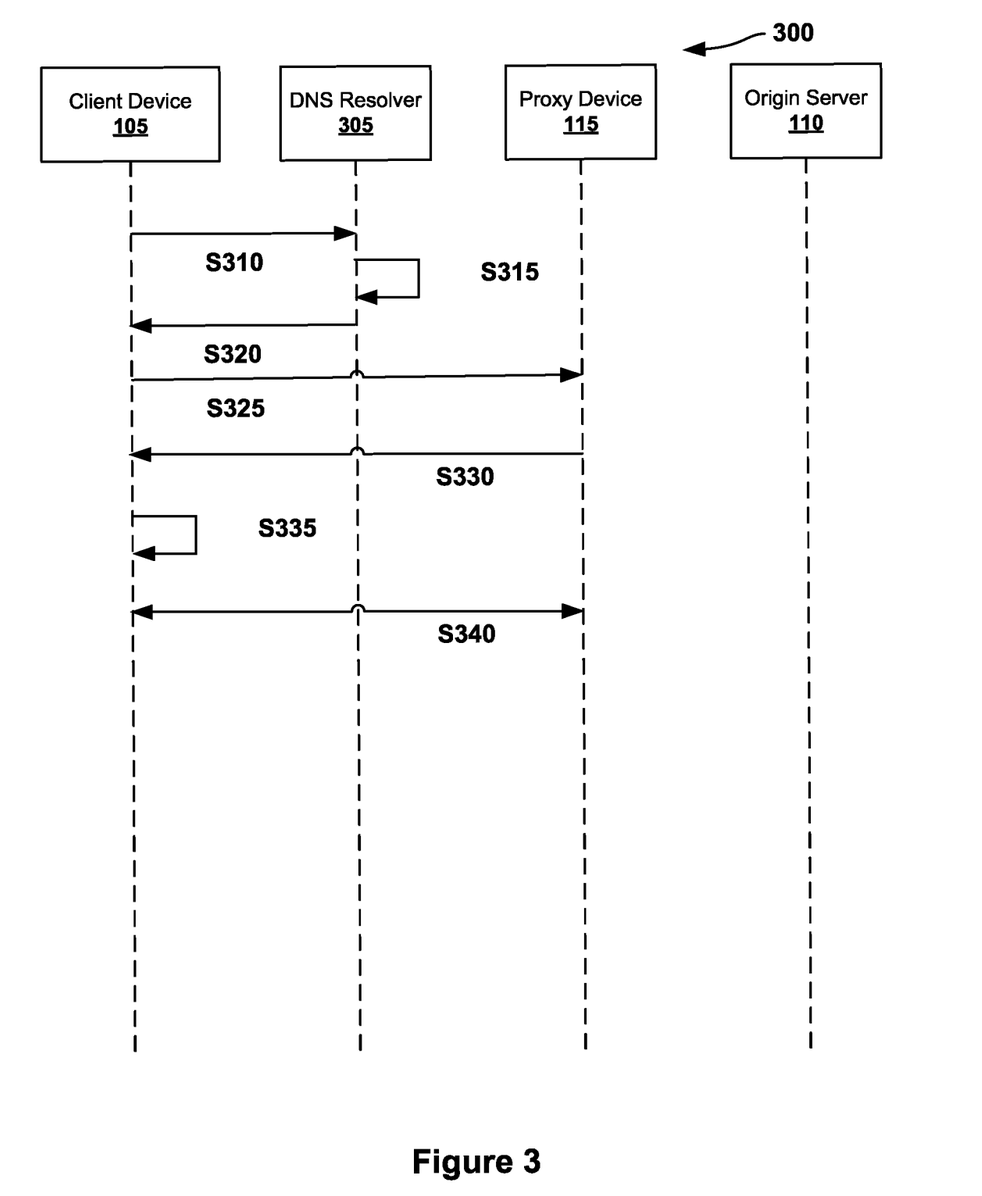
FIG. 3 illustrates a timing diagram of a process for initializing a client-side TLS connection using the HTTPS over proxy system shown in FIG. 1.

FIG. 3 illustrates a timing diagram of a process 300 for initializing a client-side TLS connection using the HTTPS over proxy system 100 (shown in FIG. 1). In the exemplary embodiment, process 300 is used to start the process to provide HTTPS communication between the client device 105 and the origin server 110. Process 300 outlines steps that occur when the client device 105 requests an HTTPS resource over the HOP system 100. For the purposes of this discussion, the client device 105, the origin server 110, the proxy device 115, and the DNS resolver 305 are distinct entities.

In step S310, the client device 105 transmits a request with a URL to the DNS resolver 305 to determine the IP address for the website of the URL. For example, the user may be browsing to their bank website or a secure portion of a shopping website. In a further embodiment of step S310, the client device 105 transmits the name of the website being accessed, for example, securebank.com, to the DNS resolver 305. The DNS resolver 305 is a server that converts domain names into IP addresses. In the exemplary embodiment, the DNS resolver 305 is a part of a larger decentralized DNS (domain name system). When the DNS resolver 305 receives the request, in step S315, the DNS resolver 305 accesses other servers in the DNS to obtain the address.

In the HOP system 100, the proxy device 115 is a registered proxy for the origin server 110. Accordingly, the DNS resolver 305 returns the IP address for the proxy device 115 when the IP address of the origin server 110 is requested. In the above example, if the IP address for securebank.com is 1.2.3.4 and the IP address for the proxy device 115 is 1.2.4.3, the DNS resolver 305 retrieves S315 the 1.2.4.3 address for the proxy device 115. In step S320, the DNS resolver 305 responds to the request from the client device 105 with the IP address of the proxy device 115.

In a further embodiment of step S320, the client device 105 obtains the IP address of the domain in the requesting URL. In this case, the IP address of the proxy device 115.

In step S325, the client device 105 initiates a TLS handshaking with the proxy device 115 by sending a TLS ClientHello message. The TLS ClientHello message includes a TLS extension indicating the support of HoP. The domain name of the requesting URL is also included in the Server Name Indication (SNI) extension.

In step S330, the proxy device 115 proceeds with the TLS handshaking as specified by TLS RFC. The proxy device 115 includes its own TLS certificate in the server certificate message. The certificate issued to an HTTP proxy is marked as an HTTP proxy certificate, such as, but not limited to, by including a proxy flag in the certificate or using well-known subdomain name (e.g., proxy.company.com) in the domain name in the certificate. In step S335, the client device 105 verifies the TLS server certificate. If the certificate is a proxy certificate, the client device 105 does not verify the server name in the certificate against the domain name in the requesting URL. The client device 105 can verify the proxy certificate against local policy to determine if the proxy device 115 is allowed to provide proxy services. If the verification of proxy certificate is successful, the client device 105 completes the TLS handshaking with the proxy device 115, and in step S340, establishes a TLS connection between the client device 105 and the proxy device 115.

Figure 4:
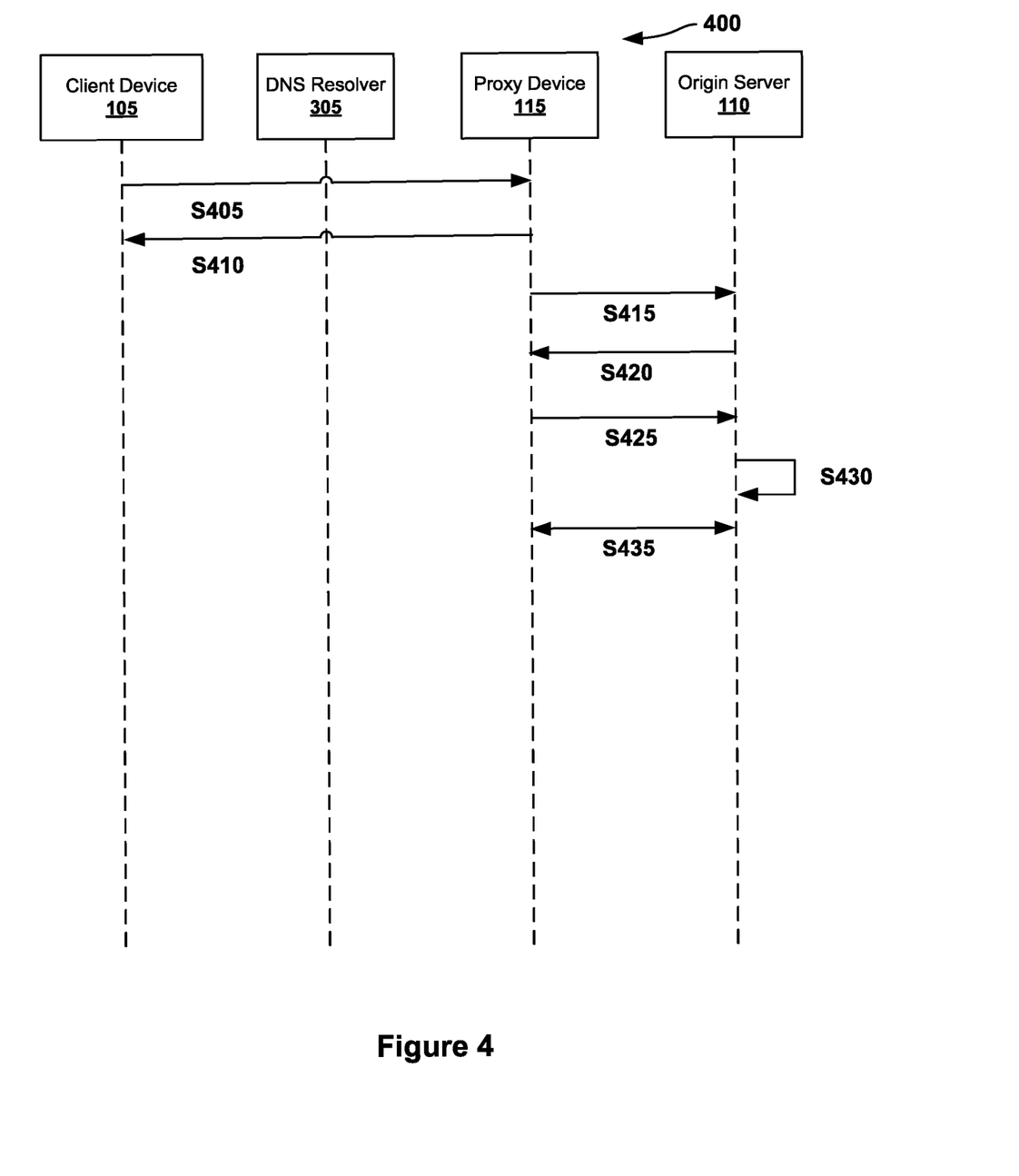
FIG. 4 illustrates a timing diagram of a process for initializing a server-side TLS connection using the HTTPS over proxy system shown in FIG. 1.
Figure 5:
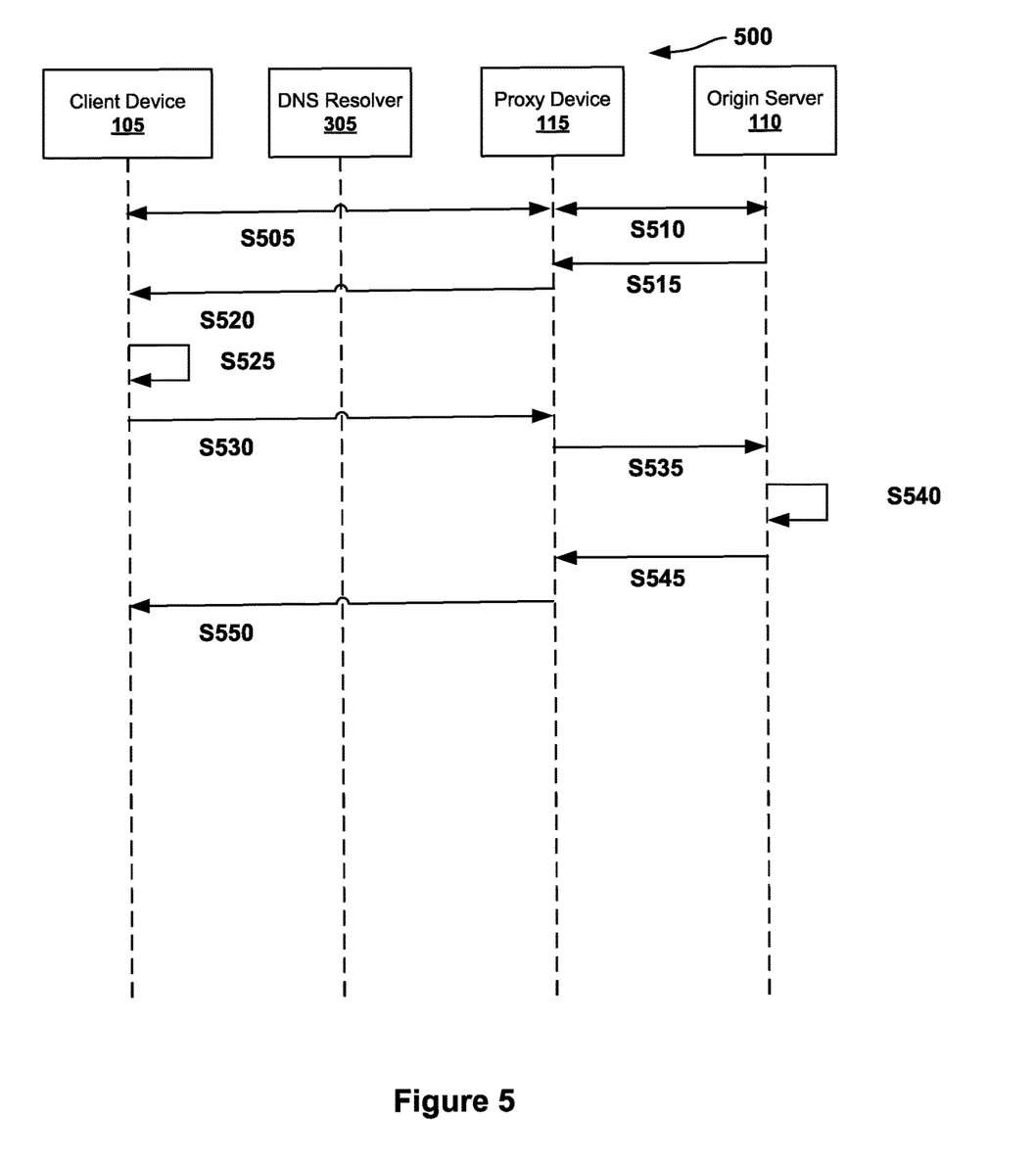
FIG. 5 illustrates a timing diagram of a process for authenticating using the HTTPS over proxy system shown in FIG. 1.

While only one proxy device 115 is shown in FIGS. 3-5, multiple proxy devices 115 could be on the path between the client device 105 and the origin server 110.

The proxy device 115 can also check if there is a valid cached HoP_token issued by the requested domain. If yes, the proxy device 115 includes the HoP_token in the TLS extension and sends it back to the client device 105, returning to step S330. If the client device 105 receives a HoP_token from the proxy device 115 during TLS handshaking, the client device 105 may return to step S335 and verify the token as specified below.

A HOP token is a cryptographically signed data structure, e.g., an JWT token, which asserts the identity of the issuer of the token, such as the origin server 110. The token may include additional assertions that can be used to facilitate authorization decision. A HOP token can include one or more of the following fields: a) iss: the issuer which is the origin server 110; b) sub: the subject (e.g., a domain name) that is authorized to provide proxying service for the issuer; c) iat or exp: a timestamp representing the time at which the token was issued or will expire; d) x5c: the X.509 certificate chain including the public key certificate of the origin server and associated intermediate CA certificates; and/or e) dsg: a digital signature using the provided certificate.

The HoP_token is validated by performing one or more of the following steps, including, but not limited to: a) determining if the digital signature of the token is valid; b) confirming that the public key certificate associated with the token is trusted; c) confirming that the domain name of the requested URL is consistent with the public key certificate (e.g., the domain names in the SubjectAltName field of the public key certificate); d) if the subject claim is present in the token, the domain name of in the proxy certificate is verified against the subject; and/or e) determining that the token has not expired yet.

In some embodiments, the HOP TLS Extension can be configured as follows:

enum{client_to_server, server_to_client}HopFlag;

struct{select (HopFlag) {case client_to_server: /*zero length body*/case server_to_client: jwt_token struct{ }JwtToken; }}HopTokenInfo;
struct{HopTokenInfo Hop_token_info; }HopTokenExtension;
The HopTokenInfo contains a HopFlag with a value of either client_to_server or server_to_client. If the HopFlag is client_to_server, the Hopflag indicates the client supports HopTokenExtension but the HopTokenInfo body is empty. If the HopFlag is server_to_client, the HopTokenInfo contains a JWT token digitally signed by the origin server. enum{/* . . . */Hop_token_info (TBD), (65535)}Extension Type;
The origin server 110 may provide a HoP_token to the proxy device during the TLS handshaking with the proxy device 115. Alternatively, the origin server 110 may provide a HoP_token by responding to an HTTP GET request for the well-known resource (e.g., /HoP-_token).

FIG. 4 illustrates a timing diagram of a process 400 for initializing a server-side TLS connection using the HTTPS over proxy system 100 (shown in FIG. 1). In the exemplary embodiment, process 400 further enables providing HTTPS communication between the client device 105 and the origin server 110. For the purposes of this discussion, the client device 105, the origin server 110, the proxy device 115, and the DNS resolver 305 are described as distinct entities from one another. The person of ordinary skill in the art though, will understand that, without departing from the scope herein, one or more of these entities may be co-located or integrated, and/or some of these entities may include at least a portion of the respective functionalities described in regard to different entities.

In an exemplary embodiment, after the TLS tunnel is established between the client device 105 and the proxy device 115 (e.g., step S340, FIG. 3), the client device 105 determines whether or not a valid HoP_token issued by the origin server 110 has been received during the TLS handshaking with the proxy device 115. If yes, the client device 105 sends the normal HTTP request to the proxy device 115. If not, the client device may initiate process 400, beginning in step S405, in which the client device 105 sends a special HTTP request for a well-known resource (e.g., /HoP_token) to the origin server 110. In step S410, if the proxy device 115 has a valid HoP-token, the proxy device 115 returns the HoP-token for the origin server 110.

If though, the proxy device 115 does not have a valid HoP-token, process 400 proceeds to step S415, in which the proxy device 115 establishes the TLS connection with the origin server 110. Similar to the TLS handshaking between the client device 105 and the proxy device 115, the proxy device 115 and the origin server 110 may also exchange the TLS HOP extension. As a part of establishing the TLS connection, in a further embodiment of step S415, the proxy device 115 initiates a TLS Hello Exchange, including indicating the HOP support, with the origin server 110. In step S420, the origin server 110 requests the client certificate identifying the proxy device 115. In step S425, the origin server 110 receives the certification from the proxy device 115 and, in step S430, the origin server 110 verifies the certification from the proxy device 115. If the verification of proxy certificate is successful, process 400 proceeds to step S435, in which the origin server 110 completes the TLS handshaking with the proxy device 115, thereby establishing a TLS connection between the origin server 110 and the proxy device 115.

The HOP extension can be included in either the header or the body of the message request. Furthermore, the HoP-_token itself can also be included in either the header or body of the message request based on the design of the extension itself.

FIG. 5 illustrates a timing diagram of a process 500 for authenticating using the HTTPS over proxy system 100 (shown in FIG. 1). In the exemplary embodiment, process 500 is used to request authentication information from and authenticate the origin server 110 and the client device 105. For the purposes of this discussion, the client device 105, the origin server 110, the proxy device 115, and the DNS resolver 305 are distinct entities. Process 500 begins at step S505, in which a first TLS connection has been completed between the client device 105 and the proxy device 115. In step S510, a second TLS connection is completed between the origin server 110 and the proxy device 115.

In an optional embodiments, process 500 initiates step S515, in which the origin server 110 transmits a HoP_token to the proxy device 115. In some embodiments of step S515, the origin server 110 transmits the HoP_token on a regular basis, such as a predetermined period of time before the previous token expires. In other embodiments of step S515, the origin server 110 transmits a plurality of HoP_tokens to the proxy device 115, where each token is only valid for a specific block of time. In such cases, this transmission may be configured to occur at a low traffic time to reduce the communication load. In at least one embodiment of step S515, the proxy device 115 further transmits a Get/hop-token message to the origin server 110.

If a valid HoP_token is received by the proxy device 115, process 500 may proceed to step S520, in which the proxy device 115 includes the token in the HTTP response to the client device 105.

Upon receipt, in step S520, of a HoP_token in the response to the GET/hop-token request, process 500 may proceed to step S525, in which the client device 105 verifies the HoP_token according to one or more of the techniques described herein. If the token verifies successfully, the client device 105 proceeds with the normal HTTP request. Otherwise, the client device 105 terminates the TLS connection.

In some embodiments, the origin server 110 may also request authentication information from the client device 105, such as in the HTTP response with the origin server's token. For example, the proxy device 115 may forward the authentication request from the origin server 110, and in step S530, the client device 105 may respond with its client_hop-_token. In step S535, the proxy device 115 forwards client_hop_token to the origin server 110. In step S540, the origin server 110 validates the client_hop_token. In some embodiments, both the client device 105 and the origin server 110 may thus have mutually validated each other based on the other's HOP_tokens.

In some embodiments, process 500 may include additional steps. For example, in step S545, the origin server 110 may transmit an authentication success message to the proxy device 115, and in step S550, the proxy device 115 may then forward the authentication success message to the client device 105.

In many embodiments, the proxy device 115 is in communication with a plurality of client device 105. In further embodiments, the proxy device 115 is in communication with and acting as a proxy for a plurality of origin servers 110. In these embodiments, the proxy device 115 may store a plurality of HoP_tokens each associated with a different origin server 110. The proxy device 115 can organize and retrieve the appropriate HoP_token based on the use the domain name of the origin server 110, which is provided by the client device 105 when setting up the TLS connection.

Figure 6A:
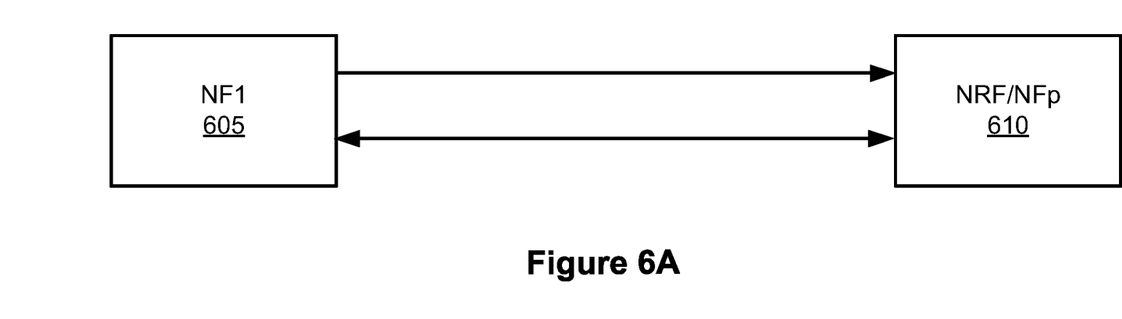
FIGS. 6A and 6B illustrate various configurations of 5G systems in accordance with at least one embodiment.
Figure 6B:
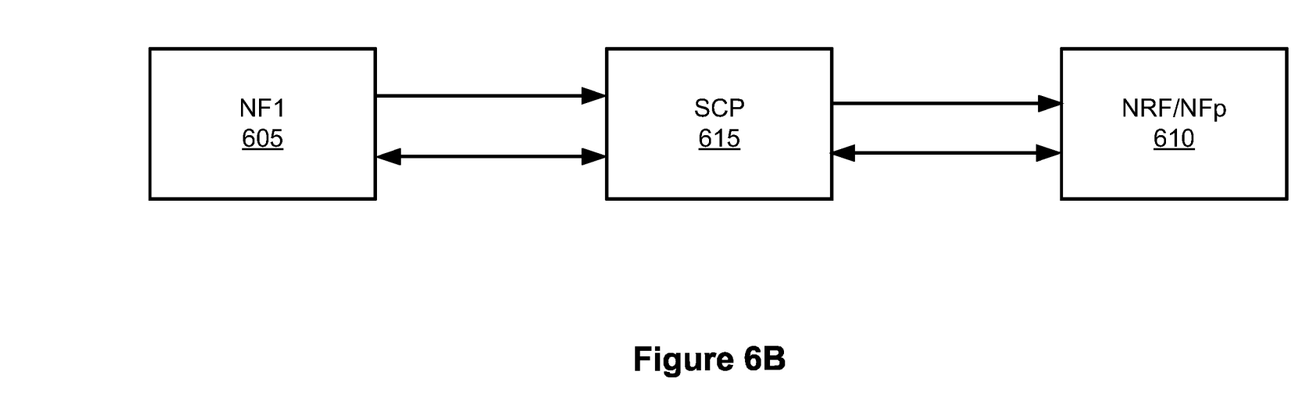

FIGS. 6A and 6B illustrate various configurations of 5G systems in accordance with at least one embodiment. FIG. 6A illustrates a first configuration of 5G relating to Release 15. FIG. 6B illustrates a second configuration of 5G relating to Release 16.

As shown in FIG. 6A, a NF1 (network function) 605 is provided in communication with a NRF (network repository functions) 610 using mutually authenticated TLS. The NRF 610 verifies the NF1 605 instance ID in the request against the identity in the NF1 TLS certificate.

As shown in FIG. 6B, the NF1 605 and the NRF 610 are separated by one or more SCPs (service communication proxies) 615. Similar to the system 100 (shown in FIG. 1), the SCP 615 uses a first MutualTLS to communicate with the NF1 605 and a second MutualTLS to communicate with the NRF 610. Since the NRF 610 does not see the NF1 TLS certificate anymore, mutual authentication between the NF1 605 and the NRF 610 is more difficult. The HOP system 100 described above could be applied to the 5G system shown in FIG. 6B, where the SCP 615 acts as the proxy device 115 (shown in FIG. 1). Furthermore, using the HOP system in 5G will increase security when the client device 105 (shown in FIG. 1) is roaming.

Figure 7:
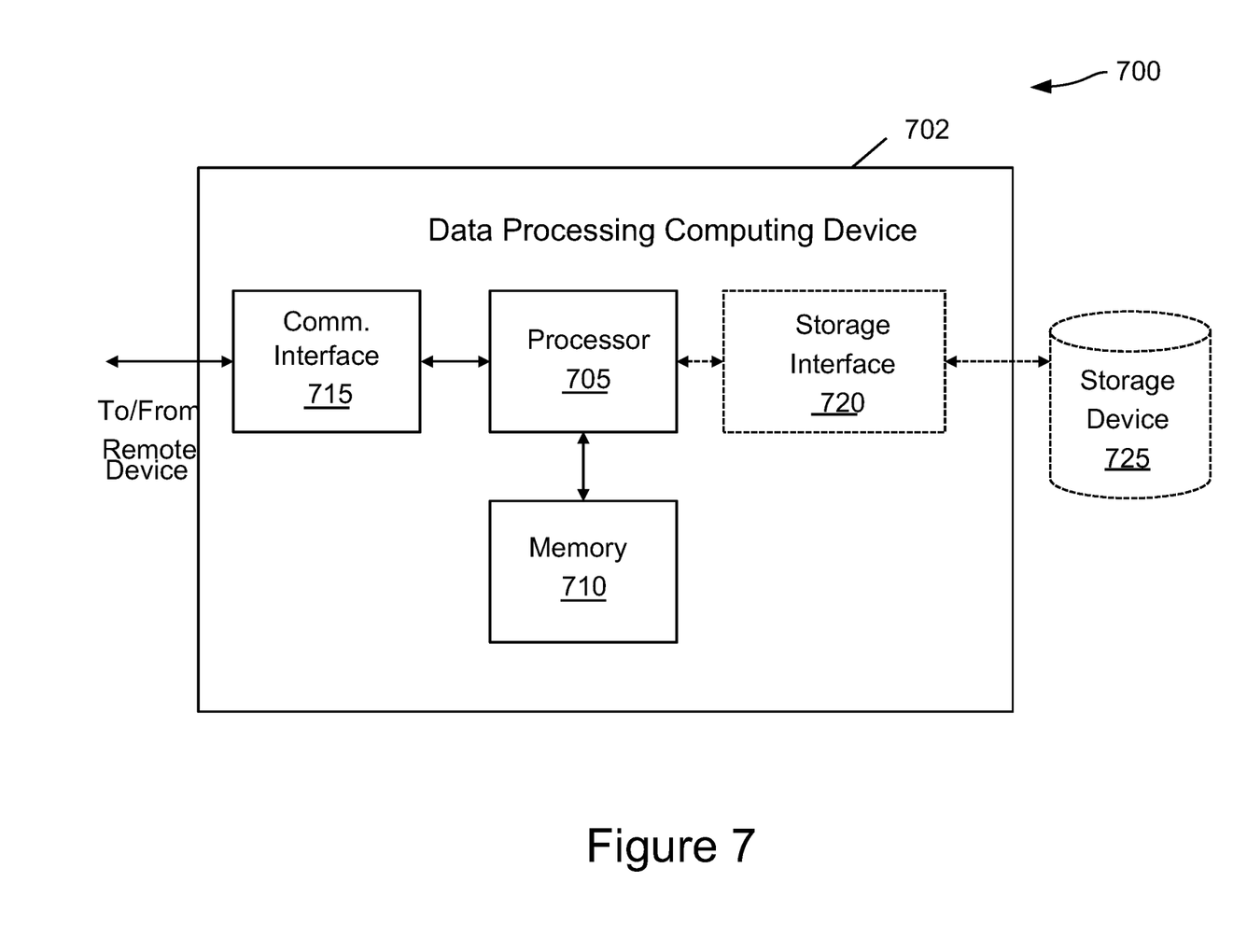
FIG. 7 illustrates a block diagram of an embodiment of a computer system or cloud server in which the present invention may be implemented.

FIG. 7 illustrates a schematic block diagram of an embodiment of a data processing system 700. In the exemplary embodiment depicted in FIG. 7, data processing system 700 may represent a computer system or cloud server in which one or more of the above-described embodiments may be implemented.

It should be appreciated that FIG. 7 provides only an illustration of one implementation and does not imply any limitations with regards to the environments in which different embodiments may be implemented. Many modifications to the depicted environments may be made based on design and implementation requirements.

Exemplary data processing system 700 is therefore intended to be representative of any electronic device capable of executing machine-readable program instructions. Data processing system 700 may be representative of a smart phone, a computer system, PDA, or other electronic devices. Examples of computing systems, environments, and/or configurations that may represented by data processing system 700 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Accordingly, data processing system 700 may include a processor 705 for executing instructions. Instructions may be stored in a memory area 710. Processor 705 may include one or more processing units (e.g., in a multi-core configuration).

Processor 705 may be operatively coupled to a communication interface 715 such that data processing system 700 is capable of communicating with a remote computing device. For example, data processing system 700 may receive messages and/or events from outside systems, such as through the origin server 110 or the proxy device 115 (both shown in FIG. 1) via the Internet and/or over a computer network.

Processor 705 may also be operatively coupled to a storage device 725 (e.g., certificate databases and/or credentials databases). Storage device 725 may be any computer-operated hardware suitable for storing and/or retrieving data.

In some embodiments, storage device 725 may be integrated in data processing system 700. For example, data processing system 700 may include one or more hard disk drives as storage device 725. In other embodiments, storage device 725 may be external to data processing system 300 and may be accessed by a plurality of data processing systems 700. For example, storage device 725 may include a storage area network (SAN), a network attached storage (NAS) system, and/or multiple storage units such as hard disks and/or solid-state disks in a redundant array of inexpensive disks (RAID) configuration.

In some embodiments, processor 705 may be operatively coupled to storage device 725 via a storage interface 720. Storage interface 720 may be any component capable of providing processor 705 with access to storage device 725. Storage interface 720 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 705 with access to storage device 725.

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on vehicles, stations, nodes, or mobile devices, or associated with smart infrastructures and/or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

In the exemplary embodiment, a processing element may be instructed to execute one or more of the processes and subprocesses described above by providing the processing element with computer-executable instructions to perform such steps/sub-steps, and store collected data (e.g., digital signatures, certificates, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

The exemplary systems and methods described and illustrated herein therefore significantly increase the security of connections using proxy devices. Thus both sides of the connection may be authenticated through the proxy device. This improved security resulting from the present embodiments is therefore considerably advantageous.

The present systems and methods are further advantageous over conventional techniques the embodiments herein are not confined to a single ecosystem, but may instead allow for versatile operation within multiple ecosystems, including the Internet and 5G systems. Accordingly, these novel techniques are of particular value to network engineers who desire to have devices securely deployed.

Exemplary embodiments of systems and methods for HTTPS over proxy are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A computer device for HTTPS over Proxy (HoP), comprising:
a transceiver configured for operable communication with at least one client device of a communication network and via secure connection with a server device; and
a processor including a memory configured to store computer-executable instructions, which, when executed by the processor, cause the computer device to:
store a plurality of communication authentication tokens each associated with a domain of a plurality of domains, wherein each communication authentication token of the plurality of authentication tokens was issued by the communication corresponding domain of the plurality of domains to assert an identity of the corresponding domain;
receive, from a client device via the communication network, a communication request message including a desired domain associated with the server device;
determine a communication authentication token of the plurality of communication authentication tokens associated with the desired domain of the plurality of domains;
transmit, to the client device, the communication authentication token associated with the desired domain, wherein the client device is configured to validate the communication authentication token; and
continue communication with the client device if the client device validates the communication authentication token.

2. The computer device of claim 1, wherein the computer device is further programmed to:
determine the communication authentication token of the plurality of communication authentication tokens that originated from the desired domain of the plurality of domains.

3. The computer device of claim 2, wherein the plurality of communication authentication tokens are HoP tokens including authentication information for the corresponding domain.

4. The computer device of claim 2, wherein the computer device is a proxy device for the plurality of domains.

5. The computer device of claim 1, wherein the communication request message is a TLS Hello exchange message.

6. The computer device of claim 1, wherein the communication request message is an HTTP request message.

7. The computer device of claim 1, wherein the computer device is further programmed to:
receive, from the server device, a client authentication request;
transmit, to the client device, the client authentication request;
receive, from the client device, a client authentication token; and
transmit, to the server device, the client authentication token, wherein the server device is configured to validate the client authentication token.

8. The computer device of claim 1, wherein the computer device is further programmed to establish a mutual TLS connection between the client device and the computer device.

9. The computer device of claim 1, wherein the computer device is further programmed to establish a mutual TLS connection between the computer device and the server device.

10. The computer device of claim 1, wherein the computer device is a service communication proxy in a 5G network.

11. A method for HTTPS over Proxy (HoP) implemented by a computer device, comprising:
a transceiver configured for operable communication with at least one client device of a communication network and via secure connection with a server device; and
a processor including a memory configured to store computer-executable instructions, the method comprising:
storing a plurality of communication authentication tokens each associated with a domain of a plurality of domains, wherein each communication authentication token of the plurality of communication authentication tokens was issued by the corresponding domain of the plurality of domains to assert an identity of the corresponding domain;

receiving, from a client device via the communication network, a communication request message including a desired domain associated with the server device;

determining a communication authentication token of the plurality of communication authentication tokens associated with the desired domain of the plurality of domains;

transmitting, to the client device, the communication authentication token associated with the desired domain, wherein the client device is configured to validate the communication authentication token; and continuing communication with the client device if the client device validates the communication authentication token.

12. The method of claim 11, further comprising:

determining the communication authentication token of the plurality of communication authentication tokens that originated from the desired domain of the plurality of domains.

13. The method of claim 12, wherein the plurality of communication authentication tokens are HoP tokens including authentication information for the corresponding domain.

14. The method of claim 12, wherein the computer device is a proxy device for the plurality of domains.

15. The method of claim 11, wherein the communication request message is a TLS Hello exchange message.

16. The method of claim 11, wherein the communication request message is an HTTP request message.

17. The method of claim 11, further comprising:

receiving, from the server device via the communication network, a client authentication request;

transmitting, to the client device, the client authentication request;

receiving, from the client device, a client authentication token; and transmitting, to the server device, the client authentication token, wherein the server device is configured to validate the client authentication token.

18. The method of claim 11, further comprising establishing a mutual TLS connection between the client device and the computer device.

19. The method of claim 11, further comprising establishing a mutual TLS connection between the computer device and the server device.

20. The method of claim 11, wherein the computer device is a service communication proxy in a 5G network.

* * * * *